United States Patent [19]
Borchardt et al.

[11] Patent Number: 5,031,698
[45] Date of Patent: Jul. 16, 1991

[54] STEAM FOAM SURFACTANTS ENRICHED IN ALPHA OLEFIN DISULFONATES FOR ENHANCED OIL RECOVERY

[75] Inventors: John K. Borchardt; Hon C. Lau, both of Houston, Tex.

[73] Assignee: Shell Oil Company, Houston, Tex.

[21] Appl. No.: 533,235

[22] Filed: Jun. 4, 1990

Related U.S. Application Data

[62] Division of Ser. No. 089,636, Aug. 26, 1987, Pat. No. 4,957,646.

[51] Int. Cl.$^5$ .................. E21B 43/22; E21B 43/24
[52] U.S. Cl. .................. 166/272; 166/303; 252/8.554
[58] Field of Search .................. 166/272, 303; 252/8.554

[56] References Cited

U.S. PATENT DOCUMENTS

| | | | |
|---|---|---|---|
| 3,412,793 | 11/1968 | Needham | 166/272 |
| 4,086,964 | 5/1978 | Dilgren et al. | 166/272 |
| 4,393,937 | 7/1983 | Dilgren et al. | 166/272 |
| 4,488,598 | 12/1984 | Duerksen | 166/272 X |
| 4,488,976 | 12/1984 | Dilgren et al. | 166/272 X |
| 4,532,993 | 8/1985 | Dilgren et al. | 166/303 |
| 4,576,232 | 3/1986 | Duerksen et al. | 166/274 |
| 4,607,700 | 8/1986 | Duerksen et al. | 166/303 |
| 4,699,214 | 10/1987 | Angstadt | 166/303 |
| 4,820,429 | 4/1989 | Lim | 166/272 X |
| 4,852,653 | 8/1989 | Borchardt | 166/272 |

Primary Examiner—George A. Suchfield

[57] ABSTRACT

An improved process for recovering oil by flowing a mixture of steam and steam foam surfactant into an oil-containing subterranean reservoir, the improvement provided by using surfactants enriched in olefin disulfonate. The surfactants may be used in either a steam drive or a steam soak process. Disulfonate-enriched steam foam surfactants and mixtures are also described.

12 Claims, 1 Drawing Sheet

STEAM FOAM SURFACTANTS ENRICHED IN ALPHA OLEFIN DISULFONATES FOR ENHANCED OIL RECOVERY

This is a division of application Ser. No. 089,636, filed Aug. 26, 1987, now U.S. Pat. No. 4,957,646.

BACKGROUND OF THE INVENTION

This invention relates to enhanced oil recovery. More specifically, this invention relates to displacing oil within a subterranean reservoir by injecting into the reservoir steam and an improved steam foam-forming surfactant which rapidly propagates in the reservoir to form a strong steam foam. Many hydrocarbons are too viscous to be recovered from subterranean oil-bearing formations without assistance. These heavy hydrocarbons can be recovered through the use of steam drives which heat the formation, lower the viscosity of the hydrocarbons, and enhance the flow of the hydrocarbons toward a production well. However, after initial injection breakthrough at the production well, the injected steam preferentially follows the breakthrough path. Also, except near the injection and production wells, the active steam zone in the reservoir tends to rise to the upper levels of the oil-bearing formation. Thus, the total amount of the formation that is swept by the steam injection is limited.

Surfactants have been injected along with steam to create a steam foam flood. The combination of steam and steam foam surfactant results in a steam foam, which is a dispersion of steam vapor in a continuous water phase, wherein at least part of the steam vapor phase is made discontinuous by liquid films, or lamellae. The presence of this foam is indicated by a reduction in the rate at which the steam travels through the reservoir. The foam creates a barrier that slows movement of the steam both to the upper levels of the oil-bearing formation, and towards the production well. This mobility reduction results in more efficient heat transfer to the oil, which increases oil recovery at the production well and results in lower average residual oil saturation in the reservoir when the steam foam drive is completed.

To maximize the rate at which oil is recovered, it is desirable to have a steam foam surfactant which forms foam rapidly in the reservoir. An efficient transport of the surfactant through the reservoir is important, because the rate at which the foam moves through the reservoir is limited by the rate at which the surfactant moves through the reservoir. Transport of the surfactant through the reservoir may be reduced by a variety of mechanisms, such as adsorption on the reservoir rock, precipitation by divalent ions present in the formation water and/or ion-exchanged off of the reservoir rock, and partitioning into the oil phase. Sufficient quantities of surfactant must be moved quickly through the reservoir to sustain the foam in a steam foam drive operation. It may be assumed that the foam transport rate is comparable to the surfactant transport rate.

Numerous prior processes have involved various uses of steam in conjunction with a surfactant, and improvements to such processes. U.S. Pat. No. 3,292,702 suggests a steam soak process in which an aqueous surfactant is injected ahead of the steam to provide an increased injectivity during the steaming period and a greater rate of production during backflow. U.S. Pat. No. 3,357,487 reveals injecting a solution of surfactant prior to or during a steam injection so that a band of the surfactant solution is displaced by the steam. U.S. Pat. No. 3,412,793 suggests that, in a relatively highly stratified reservoir, a steam soak or steam drive process for recovering oil is improved by temporarily plugging the more permeable strata with foam. U.S. Pat. No. 4,086,964 discloses recovering oil by injecting a steam foam-forming mixture through a steam channel which extends essentially between injection and production wells. U.S. Pat. Nos. 4,393,937 and 4,488,976 describe a steam foam-forming mixture in which the surfactant is a particularly effective alpha olefin sulfonate as well as methods of using such a mixture in steam drive or steam soak oil recovery processes. U.S. Pat. No. 4,488,598 discloses a steam and gas distillation drive using a foamable surfactant. U.S. Pat. No. 4,597,442 suggests a preflushing solution for increasing the rate at which the injected surfactant is propagated through the reservoir by reducing ion-exchange effects. U.S. Pat. Nos. 4,556,107 and 4,607,700 disclose a steam foam injection process improved by the use of alpha olefin sulfonate dimer surfactants. U.S. Pat. No. 4,609,044 describes an alkali-enhanced steam foam drive or soak process for recovering low gravity acidic oil. U.S. Pat. No. 4,617,995 discloses injection of a pretreating fluid ahead of at least some of the steam and steam foaming surfactant to increase the rate of surfactant transport and decrease the amount of surfactant required. U.S. Pat. No. 4,643,256 suggests a steam foaming surfactant mixture which is effective even in the presence of multivalent cations.

SUMMARY OF THE INVENTION

The present invention relates to an improved process for recovering oil by flowing a mixture of steam and steam foam surfactant into an oil-containing subterranean reservoir. It is applicable to both steam drive and steam soak operations. The improvement is provided by using a steam foam surfactant enriched in olefin disulfonate. Surfactants enriched in olefin disulfonate include those which are specifically prepared to contain high concentrations of disulfonates, as well as formulations or mixtures of disulfonate and other olefin-derived surfactants. The disulfonate-enriched steam foam-forming mixture preferably includes an aqueous solution of electrolyte, and optionally also includes a substantially noncondensible gas, with each of the components being present in proportions effective for steam foam formation in the presence of reservoir oil. The present invention also relates to the disulfonate-enriched steam foam-forming surfactants and mixtures which are described herein.

DETAILED DESCRIPTION OF THE INVENTION

Figure 1:
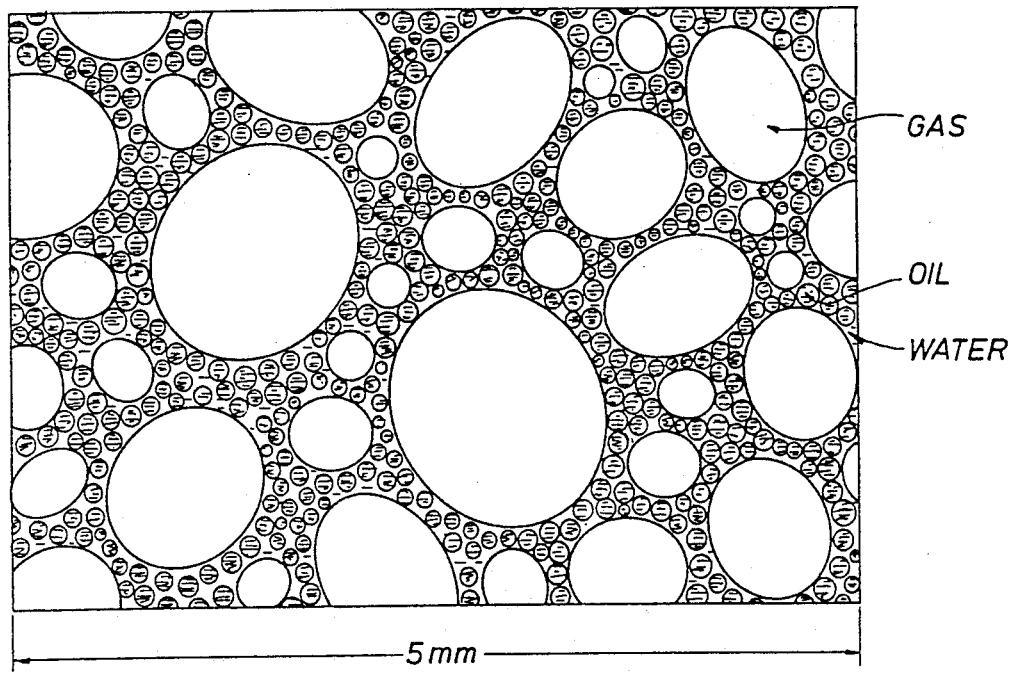
FIGS. 1 and 2 are schematic illustrations of oil droplets, dispersed in a surfactant solution with air bubbles, as viewed through a microscope.

The present invention is, at least in part, based on a discovery that the presently described novel olefin disulfonate-enriched surfactants provide unobvious and beneficial advantages in a steam foam drive process. For example, where the steam foam mixture contains steam, a disulfonate-enriched surfactant, an electrolyte, and a noncondensible gas in proportions near optimum for foam formation in the presence of oil, the new surfactants, relative to previously known, commercially available olefin sulfonate surfactants, provide lower interfacial tension with oil, move substantially as quickly through the reservoir, form stronger steam foams, and provide substantially lower steam mobilities. Also, the presently described surfactants provide substantial reductions in the mobility of steam, and significantly lower residual oil saturation, at concentrations which are significantly less than those required for equal mobility and residual oil saturation reductions by the surfactants which have been considered to be among the best available for such purpose.

The present invention further relates to novel olefin disulfonate surfactants and mixtures useful for a steam drive or steam soak process. Of particular interest in this respect are steam foam mixtures containing (a) a surfactant component present in the liquid phase of the composition in an amount between about 0.01 and about 10 wt % (calculated on the weight of the liquid phase), said surfactant component comprising in substantial part olefin disulfonate, and (b) steam which, under the reservoir conditions, is present in both a liquid phase and a gas phase. Preferably, an electrolyte may be present in the liquid phase of the composition in an amount between about 0.01 and about 15 wt % or more, and optionally, a noncondensible gas may be present in the gas phase in an amount between about 0.01 and about 50 mol % or more (calculated on total moles in the vapor phase).

The present surfactant compositions are significantly different from those prepared by conventional manufacturing processes for alpha or internal olefin sulfonates because their surfactant component is substantially enriched in olefin disulfonates. Although increased disulfonate concentration for a given carbon chain length can result in a less effective steam foam surfactant, the combination of an increase in carbon chain length (such as an increase in median carbon number from 17 to 22), and an increase in disulfonate concentration, has been found to result in an improved steam foam surfactant. Because of this, the present compositions are capable of forming stronger steam foams which significantly reduce steam mobility and produce residual oil saturations significantly less than commercially available steam foam surfactants.

The surfactant component of the mixture is an olefin sulfonate, prepared or formulated to have a disulfonate content higher than what is currently typical in commercially available olefin sulfonate compositions. In the past, standard commercially available alpha olefin sulfonates have contained up to 15 wt % disulfonates. However, since the presence of disulfonates has been viewed as undesirable in these surfactants, manufacturers have consciously reduced the disulfonate concentrations in alpha olefin sulfonate products, and currently available alpha olefin sulfonates typically contain no more than 5-7 wt % disulfonates.

The olefin sulfonates suitable for use in the present invention are preferably derived from a particular class of olefins, which may be defined for present purposes in terms of the number of carbon atoms in their molecular structure. These olefins have a carbon number in the range of about 16 to 28, preferably in the range of about 18 to 26, and most preferably in the range of about 20 to 24. Either alpha or internal olefins are considered suitable for use in the invention. Particularly suitable for purposes of the invention is an olefin sulfonate derived from substantially linear alpha-olefins or internal olefins. Olefin sulfonates derived from branched chain alpha-olefins or internal olefins are also suitable for purposes of the invention, provided the chain branches are no more than about two carbon atoms in length.

For preparation of olefin sulfonates, the olefins as described above are subjected to reaction with sulfur trioxide ($SO_3$). The term "sulfur trioxide" is intended to include any compounds or complexes which contain or yield $SO_3$ for a sulfonation reaction as well as $SO_3$ per se. This reaction may be conducted according to methods well known in the chemical arts, typically by contact of a flow of dilute $SO_3$ vapor with a thin film of liquid olefin at a temperature in the range of about 40° to 120° F. The sulfonation reaction between the $SO_3$ and the olefin yields a crude product, containing alkene sulfonic acids, and an intermediate, believed to be in the nature of a sultone. The sultone is subsequently hydrolyzed by reaction with water and neutralized by reaction with base, preferably an alkali or alkaline earth metal hydroxide, oxide, or carbonate. Although the composition of the sulfonate product varies somewhat depending on a number of factors, particularly the nature of the olefin and the sulfonation reaction conditions, where sodium hydroxide is used as the base, the four principal components are usually alkene sulfonic acid sodium salts (about 50 to 70 wt %), hydroxy-alkane sulfonic acid sodium salts (20-40 wt %), and alkene and hydroxy-alkane disulfonic acid disodium salts (5-15 wt %). Other compounds also present in the sulfonate product include sulfonates derived from 2-ethyl olefin, 2,3-dimethyl olefin, and 4-methyl olefin. The two sulfonic acid sodium salts may be characterized as monosulfonates, and the two disulfonic disodium salts may be characterized as disulfonates. Conventional manufacture typically yields as the surfactant product an aqueous solution of the olefin sulfonates, for example, a 30 wt % solution in water. Such solutions, after dilution, may be directly applied to the preparation of steam foam mixtures for purposes of this invention.

The disulfonate content of the surfactant product can be increased simply by increasing the ratio of dilute $SO_3$ vapor to liquid olefin in the sulfonation reaction. Typical olefin sulfonate processes employ an $SO_3$/olefin mole ratio of 0.90 to 1.15. $SO_3$/olefin ratios greater than 1.15 can be used to prepare olefin sulfonate mixtures that are suitably enriched in disulfonates. In a commercial facility, it may be desirable to recycle the unreacted dilute $SO_3$ vapor. Also, recycle of the sulfonated olefin product back through the sulfonation process will provide enriched disulfonate compositions at lower $SO_3$/olefin ratios in the reaction step. Olefin sulfonate compositions suitable for use in the present invention have a disulfonate content of about 15 to 100 wt %, preferably 25 to 100 wt % and most preferably 40 to 100 wt %.

The steam used in the present process and/or compositions can be generated at surface or downhole locations and supplied in the form of any dry, wet, superheated, or low grade steam in which the steam condensate and/or liquid components are compatible with, and do not inhibit, the foam-forming properties of the steam foam mixtures of the present invention. It is preferable that the quality of the steam as generated and/or amount of aqueous liquid with which it is mixed be such that the steam quality of the resulting mixture is about 10 to 90 wt %, and more preferably, about 30 to 80 wt %, at the time it enters the reservoir. The water used for forming the steam can contain other additives which enhance its properties, such as scale inhibitors and the like. The water can also contain salts.

The steam foam mixture is formed by injecting surfactant into the wet steam in an amount of from about 0.01 wt % to about 10 wt % of the liquid phase of the steam. Preferably, the surfactant is injected in as small an amount as necessary to enhance oil recovery. This is on the order of about 0.1 wt % to about 5 wt % surfactant present in the liquid phase. An aqueous electrolyte solution is preferably incorporated into the steam foam mixture, and, optionally, a noncondensible gas may also be included.

The presence in the steam foam mixture of an electrolyte may substantially enhance the formation of a foam capable of reducing residual oil saturation. Some or all of the electrolyte can comprise an inorganic salt, preferably an alkali metal salt, more preferably an alkali metal halide, and most preferably sodium chloride. Other inorganic salts, for example, halides, sulfates, carbonates, bicarbonates, nitrates, and phosphates, in the form of salts of alkali metals or alkaline earth metals, can be used. The presence of an added electrolyte may be unnecessary where the steam injected, or the connate waters present in the reservoir, contain enough electrolyte to form an effective foam.

In general, the noncondensible gas used in a steam foam mixture of the present invention can comprise substantially any gas which (a) undergoes little or no condensation at the temperatures and pressures at which the steam foam mixture is injected into and displaced through the reservoir, and (b) is substantially inert to and compatible with the steam foam surfactant and other components of that mixture. Such a gas is preferably nitrogen, but can comprise other gases, such as air, carbon dioxide, carbon monoxide, ethane, methane, flue gas, fuel gas, or the like. Preferred concentrations of noncondensible gas in the steam foam mixture fall in the range of from about 0.01 to about 50 or more mol % of the gas phase of the mixture.

Any standard method of creating a steam foam is suitable for use in the invention. A preferred process of creating the foam and sweeping the formation is disclosed in U.S. Pat. No. 4,086,964, completely incorporated herein by reference. Alternatively, the procedures outlined in U.S. Pat. No. 4,556,107 can be employed. The procedures outlined in U.S. Pat. No. 4,393,937, completely incorporated herein by reference, can be used with producing formations that contain zones of high permeability and/or are susceptible to channeling. Under some circumstances, a sand-filled line may be used to initiate foam. The steam foam mixture is injected into the reservoir at a rate determined by reservoir characteristics and well pattern area. The injection and production wells can be arranged in any pattern. Preferably, the injection well is surrounded by production wells, however, the invention is also applicable to a steam soak (single well) process.

EXPERIMENTAL RESULTS

Experiments were conducted to measure (1) interfacial tension (IFT) of surfactant mixtures against oil, (2) surfactant propagation, or transport rate, (3) foam strength and residual oil saturation (ROS) at typical steam drive temperatures, and (4) foam strength and ROS at high steam drive temperatures, all with surfactant mixtures containing various combinations of monosulfonated and disulfonated olefins.

Surfactant Sample Preparation

The surfactants evaluated are listed in Table 1. Three methods were used to prepare disulfonate-enriched surfactants for laboratory evaluation; (1) high $SO_3$/olefin ratio, (2) filtration/separation, and (3) blending.

Some disulfonate-enriched surfactants were formed simply by increasing the $SO_3$/olefin ratio in the sulfonation reaction step. Sulfonation reactions have been performed at $SO_3$/olefin ratios as high as 7.0, and products containing as much as about 84 wt % disulfonate resulted. However, limited data suggest that an increase in $SO_3$/olefin ratio above about 1.8 does not provide further improvement in surfactant characteristics, apparently due to the presence of small amounts of by-products formed at higher $SO_3$/olefin ratios.

The isolation of high purity alpha olefin disulfonates from alpha olefin sulfonates (AOS) can be accomplished by physically separating (by filtration) the liquid and semi-solid emulsion phases of the AOS product, where the median carbon number range is greater than 20. A sample of AOS 2024, with a nominal carbon number range of 20 to 24 and which overall contained 17 wt % disulfonate, was found to contain 98 wt % disulfonate in the liquid phase, but only about 2 wt % disulfonate in the semi-solid emulsion phase of the surfactant. Internal olefin sulfonate surfactants, and alpha olefin sulfonates with carbon numbers less than 20, were found to have no such distinction between the liquid and semi-solid emulsion phases. Another disulfonate enriched surfactant was formed by blending the 98 wt % disulfonate surfactant with the original AOS 2024 to give a surfactant with 65 wt % disulfonate.

The base case surfactant used for comparison in all experiments was ENORDET ® AOS 1618, a commercially manufactured AOS available from Shell Chemical Company, with a nominal carbon number range of 16 to 18. A few experiments were also conducted with CHASER ® SD1000, a commercially manufactured AOS dimer available from Chevron Chemical Company, with a nominal carbon number range of 22 to 32. The CHASER ® product is derived from alpha olefins in a reaction sequence that is different from that used to produce AOS. The AOS dimers are produced by sulfonating alpha olefins, heating the sulfonated product to cause dimerization in a separate reaction step, and then neutralizing the dimerized product. This process is fully described in U.S. Pat. No. 3,721,707.

TABLE 1

| Surfactant | SURFACTANT COMPOSITION | | Average Molecular Weight | Approximate Wt % Monosulfonate/ Disulfonate |
|---|---|---|---|---|
| | Sulfonation $SO_3$/Olefin Mole Ratio | Additional Preparation Steps | | |
| ENORDET ® AOS 1618 | 1.15 | None | 356 | 89/11 |
| AOS 2024S | 1.15 | Filtration | 427 | 98/2 |
| AOS 2024 | 1.15 | None | 441 | 83/17 |
| AOS 2024E | 1.8 | None | 469 | 58/42 |
| AOS 2024C | 1.15 | Filtration | 455 | 58/42 |

TABLE 1-continued

| | SURFACTANT COMPOSITION | | | |
|---|---|---|---|---|
| Surfactant | Sulfonation $SO_3$/Olefin Mole Ratio | Additional Preparation Steps | Average Molecular Weight | Approximate Wt % Monosulfonate/ Disulfonate |
| AOS 1618E | 2.3 | None | 402 | 39/61 |
| AOS 2024B | 1.15 | Filtration and Blending | 476 | 35/65 |
| AODS 2024 | 1.15 | Filtration | 526 | 2/98 |
| CHASER ® SD1000 | —[1] | Dimerization | 616 | 48/52[2] |

[1] U. S. Pat. No. 3,721,707 specifies a ratio of 1.2.
[2] Ratio of monomer AOS to dimer AOS.

Experimental Procedures

The IFT experiments were conducted with the use of a University of Texas Model 500 Spinning Drop Interfacial Tensiometer. The tests were conducted at 75° C., using 0.5 wt % surfactant solutions, with and without 3 wt % NaCl. The oil phase was either decane, a refined oil, or Patricia Lease, a heavy California crude oil. It has been found that stable readings for refined oils may be obtained over a shorter time period if the aqueous phase (containing surfactant, with or without salt) and oil phase are equilibrated under the test conditions prior to determination of the IFT. Consequently, when decane was used as the oil phase, the oil and surfactant solutions were first equilibrated overnight. For decane, the tensiometer tube was first filled with the surfactant mixture, and then 3 microliters of oil were added. For Patricia, first the tensiometer tube was rinsed with the surfactant mixture (to prevent the viscous oil from sticking to the tube), next 0.005 grams of oil was weighed into the tube, and then the tube was filled with the surfactant mixture. Once the oil droplets were stabilized in the tensiometer, measurements were made to allow calculation of the IFT.

Foam propagation, foam strength and ROS experiments were conducted by flowing steam-containing fluids through an oil-containing sand pack. A typical sand pack test apparatus consists of a cylindrical tube, about 1.5 inches in diameter by 12 inches long. Such a sand pack may be oriented either horizontally or vertically. The sand pack is provided with at least two pressure taps, which are positioned so as to divide the pack approximately into thirds. At the inlet end, the sand pack is preferably arranged to receive separate streams of steam, noncondensible gas, and one or more aqueous liquid solutions containing a surfactant to be tested and/or a dissolved electrolyte. Some or all of those components are injected at constant mass flow rates; proportioned so that the mixture will be homogeneous substantially as soon as it enters the face of the sand pack. The permeability of the sand pack and foam debilitating properties of the oil in the sand pack should be at least substantially equivalent to those of the reservoir to be treated. By means of such tests, determinations can be made of the proportions of surfactant, noncondensible gas, and electrolyte components which are needed in a steam of the quality to be used, in order to provide the desired treatment.

For the experiments described below, the sand packs were prepared by flooding them with Kernridge oil, a heavy California crude, at a temperature of above about 200° F., to provide oil saturations in the order of 80 to 90% of the pack pore volume. Waterfloods were conducted to reduce the oil saturations to residuals of about 30%. For the surfactant propagation experiments, the sand packs were flooded with synthetic connate water. For the foam strength and ROS experiments, distilled water was used for the waterflood, and the waterflood was followed by a wet steam drive (50 wt % quality at a superficial gas velocity of 700 ft/day) to reduce the oil saturation to about 15%. The surfactant propagation experiments were conducted with sand packs containing Kernridge sands at 280° F. Surfactant was injected continuously into the pack at 1.6 ft/day. The foam strength and resulting ROS experiments were conducted in sand packs containing Ottawa sands with a backpressure of 100 psig, and steam of 50 wt % quality was injected at a superficial gas velocity of 700 ft/day both after the waterflood and during the experiments.

Interfacial Tension (IFT)

Surfactants which provide low IFT, and hence greater oil recovery, are desirable. Results from the IFT experiments, compared with a base case of ENORDET ® AOS 1618, are shown in Table 2 and may be summarized as follows. The IFT values for ENORDET ® AOS 1618 decreased with the addition of NaCl, in place of fresh water, and are lower for Patricia crude than for decane. The IFT of AOS 2024 (about 17 wt % disulfonate), under similar conditions, was lower. This reflects the fact that as carbon number increases, solubility of the surfactant in water decreases, and IFT will decrease slightly. IFT of AODS 2024 (about 98 wt % disulfonate) was also lower than the values for ENORDET ® AOS 1618, but slightly higher than the values for AOS 2024. This shows that at constant carbon number, the IFT increases with increased disulfonate. It is concluded from these results that an increase in carbon number can more than offset the IFT reduction caused by significantly increasing the disulfonate content of the surfactant.

A few other experiments provided a qualitative measure of the difference in IFT between the ENORDET ® AOS 1618 base case and a disulfonate-enriched surfactant AOS 2024C (about 42 wt % disulfonate). Test tubes were prepared with 10 ml of an aqueous solution of 0.5 wt % surfactant and 4 wt % NaCl and about 2.5 ml of Kernridge crude, blanketed with nitrogen, sealed, and heated in an oven to about 200° F. for about two days.

TABLE 2

INTERFACIAL TENSION (IFT) STUDIES[1]

| Surfactant | % Monosulfonate/ Disulfonate | Wt % Surfactant | Aqueous Phase | Oil Phase | IFT dynes/cm |
|---|---|---|---|---|---|
| ENORDET ® AOS 1618 | 89/11 | 0.5 | fresh water | decane | 4.7 |
| ENORDET ® AOS 1618 | 89/11 | 0.5 | 3% NaCl | decane | 1.9 |
| ENORDET ® AOS 1618 | 89/11 | 0.5 | 3% NaCl | Patricia | 0.6 |
| AOS 2024S | 98/2 | 0.5 | fresh water | decane | 3.3 |
| AOS 2024 | 83/17 | 0.5 | fresh water | decane | 3.2 |
| AOS 2024 | 83/17 | 0.5 | 3% NaCl | decane | 0.59 |
| AOS 2024E | 58/42 | 0.5 | 3% NaCl | Patricia | 0.3 |
| AODS 2024 | 2/98 | 0.5 | fresh water | decane | 3.8 |
| AODS 2024 | 2/98 | 0.5 | 3% NaCl | decane | 1.3 |
| AODS 2024 | 2/98 | 0.5 | 3% NaCl | Patricia | 0.17 |
| CHASER ® SD 1000 | 48/52[2] | 0.5 | fresh water | decane | 6.8 |
| CHASER ® SD 1000 | 48/52[2] | 0.5 | 3% NaCl | decane | 4.0 |
| CHASER ® SD 1000 | 48/52[2] | 0.5 | fresh water | Patricia | 1.9 |
| CHASER ® SD 1000 | 48/52[2] | 0.5 | 3% NaCl | Patricia | 0.77 |

[1] All tests were conducted at 75° C.
[2] Ratio of monomer to dimer AOS

Figure 2:
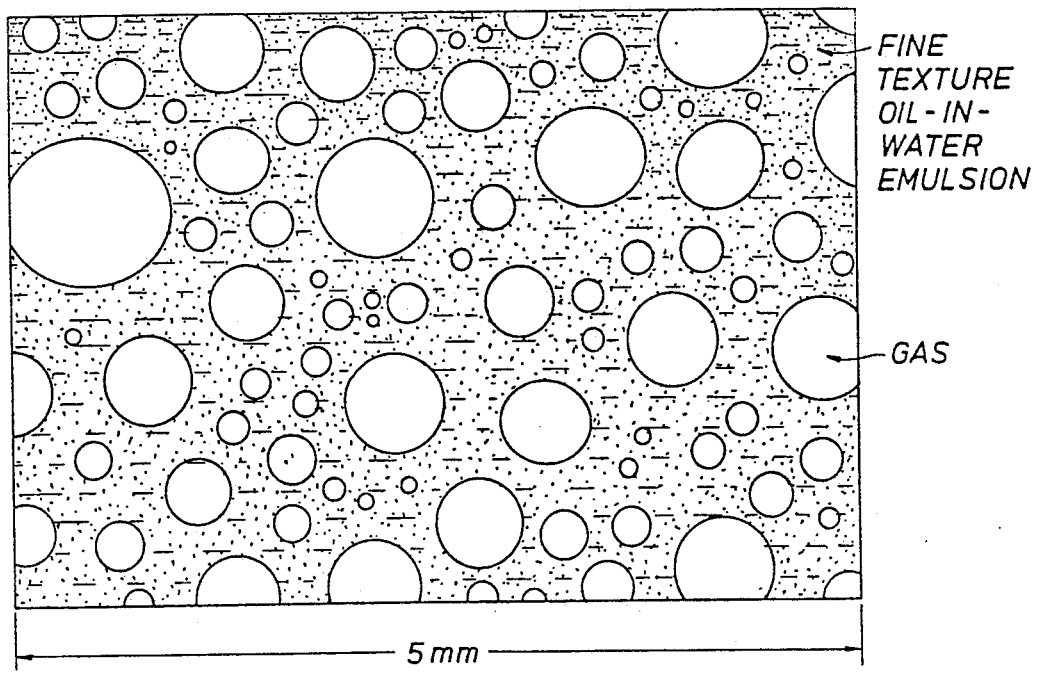

Upon removal from the oven, the tubes were shaken vigorously to form a foam. Photographs were taken through a microscope (at 50 power) of the surface of foam on the oil/surfactant solution mixture. FIG. 1 depicts the mixture with ENORDET ® AOS 1618, and FIG. 2 depicts the mixture with AOS 2024C. It can be seen from FIG. 1 that in the ENORDET ® AOS 1618 surfactant solution, the oil is present as large globules in the water lamellae surrounding the air bubbles. Note that a coarse texture oil-in-water macroemulsion is formed, which can be entraped inside a porous medium leading to a high ROS. The oil present in the AOS 2024C surfactant solution, shown in FIG. 2, is present as a very fine, oil-in-water emulsion in the water lamellae surrounding the air bubbles. Note that a fine texture oil-in-water macroemulsion is formed, which can easily flow through a porous medium leading to a low ROS. A surfactant solution that can emulsify oil into a fine emulsion can quickly produce a low ROS.

Surfactant Propagation

Surfactants which exhibit a fast rate of propagation, or transport, through the reservoir are effective at sustaining the steam foam in a steam foam drive operation. Results from the surfactant propagation rate experiments, compared with a base case of ENORDET ® AOS 1618, are shown in Table 3. The sand pack effluent was analyzed for surfactant, calcium, and chloride. Surfactant retention was calculated from an integration of the surfactant and chloride breakthrough curves. These experimentally determined surfactant retentions, in pore volumes (PV), were used in the calculations to determine surfactant propagation rates. The normalized surfactant propagation rate is equivalent to $(S_w+0.80)/(S_w+\text{Surfactant Retention})$, where $S_w$ is assumed to be 0.30 for the Kern River field, and surfactant retention using ENORDET ® AOS 1618 is equal to 0.8 PV, based on experiments with Kern River sands. It may be assumed that foam propagation rate is comparable to the surfactant propagation rate.

The results given in Table 3 can be summarized as follows. At about 0.5 wt % surfactant concentration and 4 wt % sodium chloride, the AOS 2024E, containing about 42 wt % disulfonate, propagated more rapidly than the ENORDET ® AOS 1618 with about 11 percent disulfonate. By interpolation, the AOS 2024E, at a concentration of about 0.44 wt % with 4 percent sodium chloride, would propagate as fast as a 0.5 wt % ENORDET ® AOS 1618 composition. It can be concluded that the disulfonate-enriched surfactants with increased carbon number can propagate through the reservoir substantially as quickly as the base case ENORDET ® AOS 1618.

TABLE 3

SURFACTANT PROPAGATION EXPERIMENTS WITH KERNRIDGE SAND PACKS[1]

| Surfactant | % Monosulfonate/ Disulfonate | Wt % Surfactant | Wt % NaCl | Normalized Surfactant Rates[2] |
|---|---|---|---|---|
| ENORDET ® AOS 1618 | 89/11 | 0.50 | 4 | 1.63 |
| AOS 2024 | 83/17 | 0.50 | 2 | 0.69 |
| AOS 2024E | 58/42 | 0.35 | 4 | 1.11 |
| AOS 2024E | 58/42 | 0.50 | 4 | 1.92 |
| AOS 1618E | 39/61 | 0.50 | 4 | 1.54 |
| AOS 2024B | 35/65 | 0.20 | 4 | 0.83 |
| AOS 2024B | 35/65 | 0.50 | 4 | 1.32 |

[1] Porosity = 0.36, temperature = 280° F.
[2] Normalized Surfactant Rate = $(S_w + 0.80)/(S_w + \text{Surfactant Retention})$, where $S_w$ = 0.30 and base case surfactant retention is 0.80 PV, based on experiments with Kern River sand packs.

Foam Strength and ROS at Typical Steam Drive Temperatures

Surfactants which provide a strong steam foam are effective at reducing steam mobility, and may also produce a lower ROS in the reservoir. Foam strength may be defined as the apparent steam viscosity in the presence of foam, divided by the apparent steam viscosity at the end of the steam drive. Results from the foam strength and ROS experiments, compared with a base case of ENORDET ® AOS 1618, are shown in Table 4. These experiments were conducted with a steam drive temperature of 296°–341° F.

The results shown in Table 4 may be summarized as follows. The surfactant AOS 2024B (about 65 wt % disulfonate) gave higher foam strength and a lower residual oil saturation than ENORDET ® AOS 1618 at the same concentration. Even AOS 2024, with about 17 wt % disulfonate, at only 0.2 wt % concentration, gave higher foam strength and lower ROS than ENORDET ® AOS 1618 at 0.5 wt % concentration. The AOS 2024E, with about 42 wt % disulfonate, also performed better than ENORDET ® AOS 1618, but steam foam could not be generated with either AOS 2024E or AOS 1618E using the usual procedure of injecting 50 wt % quality steam with about 0.6 mol % nitrogen in the vapor phase, and about 0.5 wt % concentration of surfactant and 4 wt % sodium chloride in the aqueous phase. Experiments with AOS 2024E and AOS 1618E, the nitrogen mole fraction was varied sequentially to evaluate the impact of nitrogen content on foam formation and strength.

Steam foam could be generated with the AOS 2024E (about 42 wt % disulfonate), when the injection nitrogen concentration was 13.3 mol %. Steam foam, thus formed, had a strength of 209, over four times stronger than the ENORDET® AOS 1618 at the same surfactant concentration. Once this foam was formed, subsequent decreases in the nitrogen from 13.3 to 9.5 and to 5.4 mol % did not significantly affect the foam strength. When the nitrogen was further decreased to 0.8 mol %, foam strength dropped about 50 percent, but still remained more than twice as high as the base case ENORDET® AOS 1618. The resulting ROS was 0.6%. ROS was determined only upon completion of the experiment, however, it appeared that most of the ROS reduction occurred when the nitrogen injection rate was 13.3 mol %. Steam foam could also be generated when the same mixture with only 0.7 mol % nitrogen was passed through a sand-filled line prior to entering the sand pack. The foam formed had a strength of 158, about three and one-half times stronger than the ENORDET® AOS 1618 at the same surfactant concentration, and the ROS was reduced to 1.3%.

The AOS 1618E, with about 61 wt % disulfonate, also failed to form a foam using the usual test procedure. However, steam foam with a strength of 27 was formed when the nitrogen rate was increased to 18 mol %. Subsequent decreases in nitrogen content to 5.9 and 2.8 mol % had no impact, but a reduction to 0.8 mol % reduced the foam strength to 14. The resulting ROS was about the same as that for the base case ENORDET® AOS 1618. The experiments with AOS 1618E illustrate that an increase in disulfonate content, without an accompanying increase in carbon number, will not provide a more effective steam foam surfactant.

Experiments with the CHASER® SD1000 (about 52 wt % dimer AOS) under similar test conditions failed to generate a foam in the presence of oil, even with no added electrolyte. In the absence of oil and electrolyte, a 0.5 wt % solution of CHASER® SD1000 with 0.6 mol % nitrogen formed a foam with a strength of 35, lower than that of the base case ENORDET® AOS 1618. The addition of 1 wt % NaCl reduced the foam strength from 35 to 6.

Foam Strength and ROS at High Steam Drive Temperatures

Steam foam surfactants must maintain their effectiveness while exposed to elevated temperatures over the sometimes lengthy time period of a steam foam drive operation. To determine the effect of a higher steam drive temperature on foam generation, a core flood experiment with AOS 2024E (about 42 wt % disulfonate), at a steam drive temperature of 385° F. and a backpressure of 200 psig, was also performed. Both the nitrogen content and surfactant concentration were varied to study their effects on foam strength. The experiment was conducted sequentially, first with a surfactant concentration of 0.5 wt %, then with a surfactant concentration of 0.1 wt %, with systematic changes in the rate of nitrogen injected with each steam foam mixture. Foam strength values were determined for each nitrogen injection rate, but ROS was determined only upon completion of the experiment. Electrolyte concentration was kept at 4 wt % NaCl in the aqueous phase. Results, shown in Table 5, can be summarized as follows.

TABLE 4

FOAM STRENGTH AND ROS AT TYPICAL STEAM DRIVE TEMPERATURES WITH OTTAWA SAND PACKS AND KERNRIDGE CRUDE

| Surfactant | % Monosulfonate/ Disulfonate | Steam Drive Temperature (°F.) | Wt % Surfactant | Wt % NaCl | Mole % Nitrogen | Foam Strength[1] | ROS % PV |
|---|---|---|---|---|---|---|---|
| ENORDET® AOS 1618 | 89/11 | 340 | 0.50 | 4 | 0.6 | 46 | 8.1 |
| AOS 2024 | 83/17 | 296 | 0.20 | 4 | 0.8 | 71 | 0.8 |
| AOS 2024E | 58/42 | 336 | 0.50 | 4 | 0.6 | No foam | — |
| AOS 2024E | 58/42 | 336 | 0.50 | 4 | 13.3 | 209 | —[2] |
| AOS 2024E | 58/42 | 336 | 0.50 | 4 | 9.5 | 220 | —[2] |
| AOS 2024E | 58/42 | 336 | 0.50 | 4 | 5.4 | 203 | —[2] |
| AOS 2024E | 58/42 | 336 | 0.50 | 4 | 0.8 | 110 | 0.6[2] |
| AOS 2024E | 58/42 | 338 | 0.50 | 4 | 0.7 | 158[3] | 1.3 |
| AOS 1618E | 39/61 | 342 | 0.50 | 4 | 0.6 | No foam[4] | — |
| AOS 1618E | 39/61 | 342 | 0.50 | 4 | 18 | 27 | —[2] |
| AOS 1618E | 39/61 | 342 | 0.50 | 4 | 5.9 | 29 | —[2] |
| AOS 1618E | 39/61 | 342 | 0.50 | 4 | 2.8 | 29 | —[2] |
| AOS 1618E | 39/61 | 342 | 0.50 | 4 | 0.8 | 14 | 7.6[2] |
| AOS 2024B | 35/65 | 337 | 0.20 | 1 | 0.8 | 60 | 6.1 |
| AOS 2024B | 35/65 | 341 | 0.50 | 4 | 0.8 | 127 | 1.0 |
| CHASER® SD1000 | 48/52[4] | 225 | 0.50 | 0 | 0.6 | No foam[5] | — |
| CHASER® SD1000 | 48/52[4] | 225 | 0.50 | 1 | 0.6 | No foam[5] | — |

[1]Foam strength is the apparent steam velocity in the presence of foam divided by the apparent steam velocity at the end of the steam drive.
[2]These experiments with AOS 2024E and AOS 1618E were conducted sequentially, with periodic reductions in nitrogen injection rates, and ROS was determined only upon completion of the experiments.
[3]Injected mixture was passed through a sand-filled line prior to entering the sand pack.
[4]Ratio of monomer AOS to dimer AOS.
[5]Crude oil used was Kern River, a heavy California crude oil.

TABLE 5

FOAM STRENGTH AND ROS AT HIGH STEAM DRIVE TEMPERATURES WITH OTTAWA SAND AND KERNRIDGE CRUDE

| Surfactant | % Monosulfonate/ Disulfonate | Steam Drive Temperature (°F.) | Wt % Surfactant | Wt % NaCl | Mole % Nitrogen | Foam Strength[1] | ROS % PV |
|---|---|---|---|---|---|---|---|
| ENORDET ® AOS 1618 | 89/11 | 340 | 0.50 | 4 | 0.6 | 46 | 8.1 |
| AOS 2024E | 58/42 | 385 | 0.50 | 4 | 18.6 | 224 | —[2] |
| AOS 2024E | 58/42 | 385 | 0.50 | 4 | 12.3 | 168 | —[2] |
| AOS 2024E | 58/42 | 385 | 0.50 | 4 | 9.3 | 224 | —[2] |
| AOS 2024E | 58/42 | 385 | 0.50 | 4 | 0.8 | 112 | —[2] |
| AOS 2024E | 58/42 | 385 | 0.10 | 4 | 0.8 | 75 | —[2] |
| AOS 2024E | 58/42 | 385 | 0.10 | 4 | 6.5 | 168 | <1[2] |

[1] Foam strength = apparent steam viscosity in the presence of foam divided by the apparent steam velocity at the end of the steam drive.
[2] Experiment was conducted sequentially, with periodic changes in nitrogen injection rates, and ROS was determined only upon completion of the experiment.

Foam strength increased with nitrogen mol % in a way similar to that at the lower steam drive temperature of 336° F. At 0.8 mol % nitrogen, a decrease in surfactant concentration from about 0.5 to about 0.1 wt % decreased the foam strength from 112 to 75 but still remained greater than the ENORDET® AOS 1618 foam strength of 46. Furthermore, at about 0.1 wt % surfactant, an increase in nitrogen content of 0.8 to 6.5 mol % increased the foam strength to 168, almost four times the ENORDET® AOS 1618 value. An ROS of less than 1 percent was obtained at the end of the experiment.

With a steam drive temperature of 385° F., the highest temperature reached during steam foam injection was 460° F. This high steam temperature did not have an adverse effect on foam strength, indicating that the surfactant was still surface active at 460° F. However, it must be noted that at the very high injection rates used, the residence time of the surfactant in the sand pack was only about 80 minutes, which might not have been long enough for thermal decomposition reactions to come to equilibrium.

It can be concluded from these experiments that the steam foam formed by appropriately sized, disulfonate-enriched surfactants is substantially stronger than that formed by ENORDET® AOS 1618. Consequently, a lower concentration of disulfonate-enriched surfactant can be used to generate foam of the same strength. Also, with AOS 2024E, for example, foam strength is more sensitive to nitrogen than surfactant concentration. This means that, as far as foam strength is concerned, increasing nitrogen content (which may be necessary to initiate foam) can more than compensate for decrease in surfactant concentration. These two factors may give disulfonate-enriched surfactants a substantial economic advantage over ENORDET® AOS 1618 in field applications.

What is claimed is:

1. A process for recovering oil from a reservoir penetrated by at least one injection well and at least one production well, comprising:
    displacing through the reservoir a steam form-forming mixture of steam and an olefin sulfonate surfactant, the olefin sulfonate surfactant containing at least about 25 wt % olefin disulfonate wherein the olefin sulfonate surfactant is derived from olefins with carbon numbers in the range of about 16 to 28; and
    recovering displaced hydrocarbons from the production well.

2. A process for recovering oil from a reservoir penetrated by at least one injection well and at least one production well, comprising:
    injecting into the reservoir a steam foam-forming mixture of steam and an olefin sulfonate surfactant, the olefin sulfonate surfactant containing at least about 25 wt % olefin disulfonate where in the olefin sulfonate surfactant is derived from olefins with carbon numbers in the range of about 16 to 28; and
    displacing the steam foam-forming mixture within the reservoir to assist in recovery of hydrocarbons at the production well.

3. The process of claim 2 wherein an electrolyte is injected in a concentration from about 0.1 wt % to about 15.0 wt % the aqueous phase of the injected steam foam-forming mixture.

4. The process of claim 2 wherein a noncondensible gas is injected in an amount of from about 0.01 mol % to about 50 mol % of the gaseous phase of the injected steam foam-forming mixture.

5. The process of claim 4 wherein the surfactant contains at least about 40 wt % olefin disulfonate.

6. A process for recovering oil from a reservoir through the use of a single well, comprising:
    injecting into the reservoir a steam foam-forming mixture of steam and olefin sulfonate surfactant, the olefin sulfonate surfactant containing at least about 25 wt % olefin disulfonate wherein the olefin sulfonate surfactant is derived from olefins with carbon numbers in the range of about 16 to 28; and
    producing the steam foam-forming mixture and oil from the reservoir.

7. The process of claim 6 wherein an electrolyte is injected in a concentration from about 0.1 wt % to about 15.0 wt % the aqueous phase of the injected steam foam-forming mixture.

8. The process of claim 7 wherein a noncondensible gas is injected in an amount of from about 0.01 mol % to about 50 mol % of the gaseous phase of the injected steam foam-forming mixture.

9. A process for recovering oil from a reservoir penetrated by at least one injection well and at least one production well, comprising:
    injecting into the reservoir a steam foam-forming mixture, comprising:
    (a) steam, which includes at least about 30 wt % vapor phase;
    (b) olefin sulfonate surfactant, containing at least about 25 wt % olefin disulfonate wherein the olefin sulfonate surfactant is derived from olefins with carbon numbers in the range of about 16 to 28 and wherein the olefin sulfonate surfactant is present in a concentration of from about 0.1 wt % to about 5.0 wt % of the surfactant in the aqueous phase of the injected mixture;

(c) electrolyte, in a concentration of from about 0.1 wt % to about 15.0 wt % of the aqueous phase of the injected mixture; and (d) noncondensible gas, in an amount of from about 0.01 mol % to about 50 mol % of the gaseous phase of the injected materials; and displacing the steam foam-forming mixture within the reservoir to assist in recovery of oil at the production well.

10. A process for recovering hydrocarbons from a reservoir penetrated by at least one injection well and at least one production well, comprising:

injecting into the reservoir a steam foam-forming mixture which consists essentially of:

(a) steam, which includes at least about 30 wt % vapor phase;

(b) olefin sulfonate surfactant containing at least about 25 wt % olefin disulfonate wherein the olefin sulfonate surfactant is derived from olefins with carbon numbers in the range of about 16 to 28 and wherein the olefin sulfonate surfactant is present in a concentration of from about 0.1 wt % to about 5.0 wt % of the surfactant in the aqueous phase of the injected mixture;

(c) electrolyte, in a concentration of from about 0.1 wt % to about 15.0 wt % of the aqueous phase of the injected mixture; and (d) noncondensible gas, in an amount of from about 0.01 mol % to about 50 mol % of the gaseous phase of the injected materials; and displacing the steam foam-forming mixture within the reservoir to assist in recovery of oil at the production well.

11. The process of claim 10 wherein the electrolyte is selected from the group consisting of potassium chloride, sodium chloride, and mistures thereof.

12. The process of claim 10 wherein the noncondensible gas consists essentially of nitrogen.

* * * * *

UNITED STATES PATENT AND TRADEMARK OFFICE
CERTIFICATE OF CORRECTION

PATENT NO. : 5,031,698

DATED : July 16, 1991

INVENTOR(S) : John K. Borchardt, Hon Chung Lau, and Enoch J. Ledet

It is certified that error appears in the above-identified patent and that said Letters Patent is hereby corrected as shown below:

Title page, item (75):

```
        INVENTORS ARE:  JOHN K. BORCHARDT
                        HON CHUNG LAU
                        ENOCH J. LEDET
```

Signed and Sealed this

Ninth Day of February, 1993

Attest:

STEPHEN G. KUNIN

*Attesting Officer*    *Acting Commissioner of Patents and Trademarks*